United States Patent [19]

Koutoudis et al.

[11] Patent Number: 4,773,638
[45] Date of Patent: Sep. 27, 1988

[54] DEPOSIT DRAWER FOR A DOCUMENT PROCESSING EQUIPMENT FOR THE DEPOSIT OF DOCUMENTS HAVING DIFFERENT SIZES

[75] Inventors: Konstantin Koutoudis; Guenter Reisacher, both of Konstanz; Dieter Wurster, Radolfzell, all of Fed. Rep. of Germany

[73] Assignee: Computer Gesellschaft Konstanz mbH, Fed. Rep. of Germany

[21] Appl. No.: 24,793

[22] Filed: Mar. 11, 1987

[30] Foreign Application Priority Data

Mar. 11, 1986 [DE] Fed. Rep. of Germany ... 8606645[U]

[51] Int. Cl.⁴ ............................................. B65H 31/20
[52] U.S. Cl. .................................... 271/223; 271/171; 312/330 SM; 206/555
[58] Field of Search ............... 271/171, 223, 224, 144; 312/183, 185, 193, 330 SM; 206/449, 555, 556

[56] References Cited

U.S. PATENT DOCUMENTS

| 1,221,831 | 4/1917 | Burt | 271/171 X |
| 1,987,803 | 1/1935 | Ryan | 271/171 |
| 4,030,725 | 6/1977 | Fukui | 271/171 X |
| 4,032,136 | 6/1977 | Komaba | 271/171 X |

Primary Examiner—Richard A. Schacher
Attorney, Agent, or Firm—Hill, Van Santen, Steadman & Simpson

[57] ABSTRACT

The deposit drawer includes a first slide which is guided carriage-like in a longitudinal channel open at one side which is provided in the deposit drawer by a second slide guided carriage-like in a longitudinal channel of the first slide and having a detent angle put in place thereon; and by a fashioning of both slides in such fashion that the upper surfaces of the deposit drawer, first slide, and second slide merge flush into one another.

6 Claims, 1 Drawing Sheet

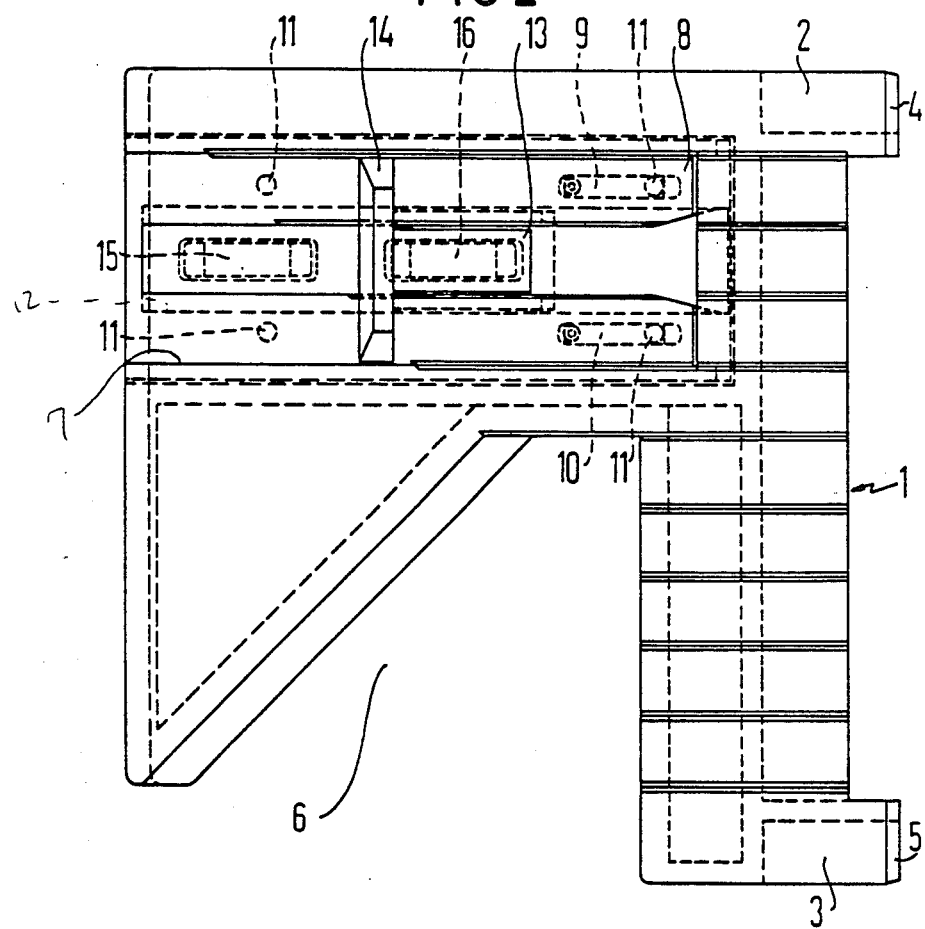

DEPOSIT DRAWER FOR A DOCUMENT PROCESSING EQUIPMENT FOR THE DEPOSIT OF DOCUMENTS HAVING DIFFERENT SIZES

BACKGROUND OF THE INVENTION

1. Field of the Invention

The invention relates to a deposit drawer for a document processing equipment for the deposit of documents having different sizes upon the employment of a detent angle displaceably arranged in the deposit drawer and adjustable to the respective document size.

2. Description of the Prior Art

In view of the multitude of document formats and document sizes, document processing equipment, for example forms readers, are frequently already so universely designed that a processing of different documents can be unproblematically implemented without special measures. In particular, the input and output drawers are expediently designed such that they can adapted to different document sizes by means of easily adjustable detents.

SUMMARY OF THE INVENTION

An object of the present innovation is to provide a deposit drawer that offers an optimally great range of variation with reference to the deposit of documents of different sizes.

In accord with the innovation, this object is achieved by a first slide which is guided carriage-like in a longitudinal channel open at one side which is provided in the deposit drawer; by a second slide guided carriage-like in a longitudinal channel of the first slide and including a detent angle put in place thereon; and by a formation of both slides in such fashion that the cover surfaces of the deposit drawer, the first and second slide merge flush into one another. The advantage of this deposit drawer having the two slides arranged inter-engaging is that, proceeding from a medium document size, an infinite adaptation to the larger document formats can be achieved by withdrawing the first slide and, with inserted first slide, a likewise infinite adaptation to smaller document formats can be achieved by additional insertion of the second slide.

Advantageous developments of the innovation are recited in the subclaims.

BRIEF DESCRIPTION OF THE DRAWINGS

An examplary embodiment of the innovation shall be set forth in greater detail with reference to the drawings.

FIG. 1 is a side sectional view of a deposit drawer embodying the principles of the present invention.

FIG. 2 is a plan view of the deposit drawer of FIG. 1.

DESCRIPTION OF THE PREFERRED EMBODIMENTS

In a side sectional view and a plan view, FIGS. 1 and 2 show a deposit drawer 1 that is suspended in a housing opening of a document processing equipment, for example a forms reader, with the assistance of two corner alignment pieces 2, 3 which are tapered wedge-like and are held in the housing by stop strips 4, 5 engaging therebehind. The deposit drawer 1 has an essentially rectangular shape including a cut-out portion 6, for example a trapezoidally cut-out portion 6 provided at a long side. This cut-out portion 6 facilitates the removal of the documents insofar as the documents can be grabbed in the region of the cut-out portion 6 both from above as well as from below. The cut-out portion 6 thereby extends toward the inside to such a degree that documents having a smaller format can also be grasped at both sides. This recess also serves as a viewing window. Given a plurality of deposit drawers arranged above one another, it can be easily determined whether documents have been deposited in the deposit drawers located below one another.

For adaptation to different document sizes, a first slide 8 guided carriage-like in a longitudinal channel 7 of the deposit drawer 1 is provided, this being capable of being withdrawn with infinite variation from the deposit drawer 1 given the deposit of larger documents. This first slide 8, for example, is guided dove-tail-like along its edges and includes two catch springs 9, 10 at its inserted end which engage into correspondingly shaped catch points 11 in the longitudinal channel 7 shaped to capture the springs in an innermost and outermost final position settings of the slide 8.

A further longitudinal channel 12 is provided at the upper side of the first slide 8, a second slide 13 being guided therein. A detent angle 14 is attached to the back end of this second slide 13 to project upwardly from an upper surface of the slide 13. The drawings show the second slide 13, which is infinitely adjustable relative to the first slide 9, in its innermost position which is used during the deposit of small documents. The deposit drawer 1 comprising the two slides 8, 13 can thus be adjusted to arbitrary document sizes between DIN A4 ($21 \times 29.7$ cm) and DIN A7 ($7.4 \times 10.5$ cm ). The length of the deposit drawer 1, however, corresponds to only half the length of the largest document to be processed, so that its dimensions are roughly equivalent to a DIN A5 ($14.8 \times 21$ cm) format.

Leaf springs 15, 16 acting as brake springs which are bent wave like are provided at the underside of the two slides 8, 13. These leaf springs 15, 16 are arranged in flat or shallow spring troughs 17, 18 in the longitudinal channel of the deposit drawer 1 or, respectively, at the underside of the second slide 13. An upper surface of each of the two slides 8, 13 moreover, proceeds flush with an upper surface of the deposit drawer 1 so that a planar seating surface derives overall.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A deposit drawer for a document processing equipment for the deposit of documents having different sizes upon employment of a detent angle arranged displaceably in the deposit drawer and adjustable to the respective document size, comprising:

a first slide which is guided carriage-like in a longitudinal channel open at one side which is formed in a floor surface of the deposit drawer;

a second slide guided carriage-like in a longitudinal channel of the first slide and including a detent angle put in place thereon; and a formation of both slides in such fashion that upper surfaces of the deposit drawer floor, the first slide, and second slide merge flush into one another.

2. A deposit drawer according to claim 1, wherein a pre-stressed brake spring is provided between said deposit drawer and said first slide.

3. A deposit drawer according to claim 2, wherein the brake spring is fashioned as a leaf spring bent wave-like and is embedded in a flat spring trough in the deposit drawer adapted in length to the length of the leaf spring.

4. A deposit drawer according to claim 1, wherein a pre-stressed brake spring is provided between said first and second slides.

5. A deposit drawer according to claim 1, wherein the length of the deposit drawer is selected at least equal to half the length of the largest document to be processed.

6. A deposit drawer for a document processing equipment for the deposit of documents having different sizes upon employment of a detent angle arranged displaceably in the deposit drawer and adjustable to the respective document size, comprising:
- a first slide which is guided carriage-like in a longitudinal channel open at one side which is provided in deposit drawer;
- a second slide guided carriage-like in a longitudinal chanel of the first slide and including a detent angle put in place thereon; and
- a formation of both slides in such fashion that upper surfaces of the deposit drawer, the first slide, and second slide merge flush into one another;
- at least one catch spring being provided on the first slide and the longitudinal channel allocated to the first slide including catch points shaped to capture said catch spring in an innermost and outermost final position of said first slide.

* * * * *